United States Patent
Sawada

(10) Patent No.: US 7,721,766 B2
(45) Date of Patent: May 25, 2010

(54) FLUID TRANSFER TUBE

(75) Inventor: Kazunori Sawada, Mie (JP)

(73) Assignee: Nitta Moore Company, Osaka (JP)

( * ) Notice: Subject to any disclaimer, the term of this patent is extended or adjusted under 35 U.S.C. 154(b) by 0 days.

(21) Appl. No.: 12/414,945

(22) Filed: Mar. 31, 2009

(65) Prior Publication Data
US 2009/0242062 A1 Oct. 1, 2009

(30) Foreign Application Priority Data
Apr. 1, 2008 (JP) .............................. 2008-095548

(51) Int. Cl.
*F16L 53/00* (2006.01)

(52) U.S. Cl. .............................. 138/32; 138/28; 138/33; 138/121

(58) Field of Classification Search ................... 138/33, 138/32, 109, 121; 385/221.1
See application file for complete search history.

(56) References Cited

U.S. PATENT DOCUMENTS

| 3,079,673 | A | * | 3/1963 | Loehlein et al. | ................ | 29/611 |
| 4,089,351 | A | * | 5/1978 | Ward et al. | ................ | 138/109 |
| 4,214,147 | A | * | 7/1980 | Kraver | ................ | 392/468 |
| 6,354,332 | B1 | * | 3/2002 | Burkhardt et al. | ................ | 138/109 |
| 2008/0271801 | A1 | * | 11/2008 | Sonderegger et al. | ................ | 138/33 |

FOREIGN PATENT DOCUMENTS

JP 2005-351333 12/2005
WO WO 2007073286 A1 * 6/2007

* cited by examiner

*Primary Examiner*—Patrick F Brinson
(74) *Attorney, Agent, or Firm*—Hahn & Voight PLLC; Roger C. Hahn

(57) ABSTRACT

A problem solved by this invention is to enable prevention of damage to a connector in a fluid transfer tube that is made by mounting a connector to an end of a tube, even when an outside air temperature falls below freezing point. The problem is solved as follows. In a fluid transfer tube that is made by mounting pipe joints to ends of a tube that has elasticity, tube connecting portions of the pipe joints and sections of the tube in the vicinity of the tube connecting portions are covered with heat radiation preventing covers to thereby delay freezing of a fluid inside the tube sections that are covered by the heat radiation preventing covers.

12 Claims, 2 Drawing Sheets

FLUID TRANSFER TUBE

BACKGROUND OF THE INVENTION

1. Field of the Invention

This invention relates to a fluid transfer tube that can prevent damage to a pipe joint caused by freezing and expansion of a fluid.

2. Description of the Related Art

In a state in which a fluid within a tube and a pipe joint is hermetically sealed in a condition in which a tube connecting portion (for example, a so-called "barb connection") of a pipe joint is mounted to an end of a tube, a phenomenon occurs in which, as the outside air temperature drops below freezing point, a fluid that is moving from a midway part of the tube towards the pipe joint side freezes. At that time, if the tube connecting portion is a tube connecting portion of a pipe joint at an end of a tube as described in Japanese Patent Laid-Open No. 2005-351333A, a phenomenon occurs in which the pipe joint is damaged by freezing and expansion of the fluid.

In this connection, it is inadvisable to make design changes to the pipe joint based on respective conditions in order to prevent the phenomenon described above from occurring. This is because costs will arise such as expenses necessary to change the design and expenses for the molding tools.

SUMMARY OF THE INVENTION

An object of this invention is to provide a fluid transfer tube that is made by mounting a pipe joint to an end of a tube, in which the pipe joint is not damaged even when an outside air temperature drops below freezing point.

Thus, a fluid transfer tube according to this invention include a pipe joint mounted to an end of a tube having elasticity, wherein a tube connecting portion of the pipe joint and a tube portion in a vicinity of the tube connecting portion are covered with a heat radiation preventing cover to delay freezing of a fluid inside the tube portion that is covered with the heat radiation preventing cover.

Furthermore, according to the present invention, a cord heater is passed through the inside of the tube.

In addition, according to the present invention, the heat radiation preventing cover comprises a corrugated tube.

Still furthermore, according to the present invention, the tube portion that is covered with the heat radiation preventing cover can absorb an amount of a volume increase that is caused by freezing of a fluid inside the pipe joint, by means of elasticity of the tube portion that is covered with the heat radiation preventing cover to delay freezing.

DESCRIPTION OF THE PREFERRED EMBODIMENTS

Hereunder, preferred embodiments are described in detail as best modes for implementing the fluid transfer tube of this invention.

Embodiment 1

Regarding the Fundamental Structure of the Fluid Transfer Tube

Figure 1:
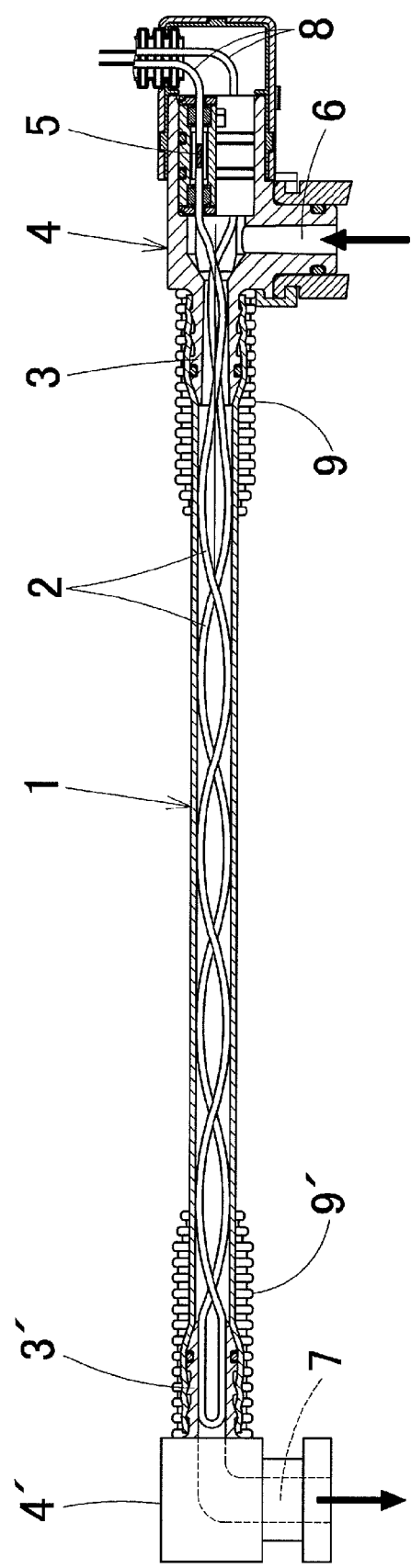
FIG. 1 is a sectional view of a fluid transfer tube according to an embodiment of this invention.

As shown in FIG. 1, the fluid transfer tube of the present invention is made by pressingly inserting the ends of a tube 1 through which a cord heater 2 has been passed, between tube connecting portions 3 and 3' that are arranged in pipe joints 4 and 4'. In this connection, the fluid transfer tube is configured such that a fluid flows according to the following route: inflow opening 6→tube connecting portion 3→tube 1→tube connecting portion 3'→outflow opening 7.

In this case, the aforementioned tube connecting portions 3 and 3' and tube portions in the vicinity of the tube connecting portions 3 and 3' are covered with heat radiation preventing covers (for example, corrugated tubes 9 and 9') as shown in FIG. 1. Further, as shown in FIG. 1, the cord heater 2 is connected to a lead wire 8 by a connecting portion 5, and is thereby connected to a power source.

The sizes and the like of the above described constituent members are as follows:

(1) Pipe joints 4, 4': material is composed of an aromatic polyamide resin.

(2) Corrugated tubes 9, 9': total length is 50 mm/external diameter: 14 mm, internal diameter: 10 mm/flame retardant polypropylene/heat resistant vinyl stopper at one end (3) Tube 1:

(Test piece 1): two-layer tube with an outer diameter of 8 mm and an inner diameter of 6 mm/length of 1 m (inner layer is fluororesin, outer layer is polyamide resin)

(Test piece 2): two-layer tube with an outer diameter of 8 mm and an inner diameter of 6 mm/length of 1 m; material is the same as test piece 1

(Test Items and Method)

First, urea water was filled in a fluid transfer tube test piece that had been confirmed as having no leakages by an airtightness test, and the inflow opening 6 and outflow opening 7 were sealed.

Next, the external diameter of the tube 1 inside the corrugated tubes 9 and 9' was measured before freezing, and the test piece was left in a −30° C. environmental chamber for four hours. The external diameter of the tube 1 inside the corrugated tubes 9 and 9' was measured as it was in a frozen state after four hours, and after thawing and draining the urea water the external diameter of the tube 1 inside the corrugated tubes 9 and 9' was measured and an airtightness test was performed to check for cracking and the like.

(Results)

For test piece 1:
external diameter of tube 1 before freezing: 8.05 mm
external diameter of tube 1 when frozen: 8.67 mm
external diameter of tube 1 when thawed: 8.05 mm
airtightness test: no leakage For test piece 2:
external diameter of tube 1 before freezing: 8.03 mm
external diameter of tube 1 when frozen: 8.65 mm
external diameter of tube 1 when thawed: 8.04 mm
airtightness test: no leakage (Discussion)

Figure 2:
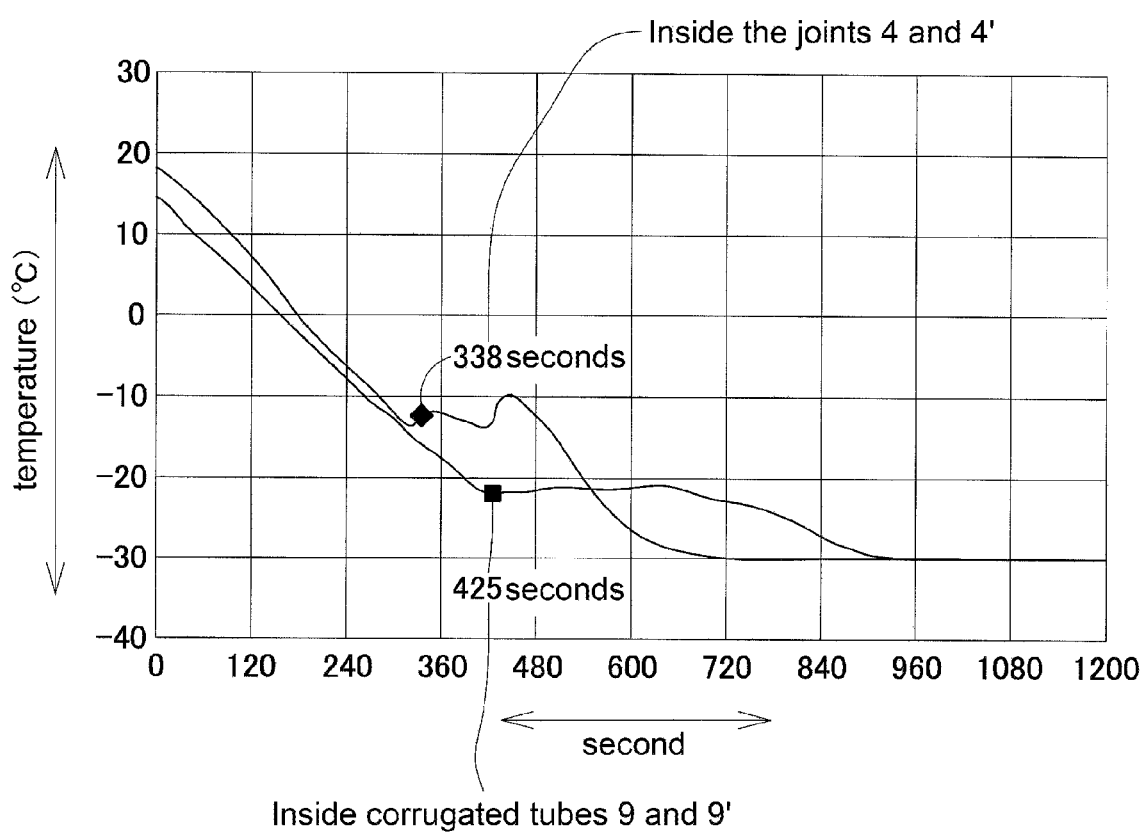
FIG. 2 is a graph of data that records changes in the temperature of urea water inside a pipe joint and changes in the temperature of urea water inside a corrugated tube.

FIG. 2 shows data that records changes in the temperature of the urea water inside the pipe joints 4 and 4', and changes in the temperature of the urea water inside the corrugated tubes 9 and 9'.

In this case, while the freezing start time of the urea water inside the pipe joints 4 and 4' was 338 seconds, the freezing start time of the urea water inside the tube 1 inside the corrugated tubes 9 and 9' was 425 seconds. It was thus found that there was a time difference between the freezing start times.

Based on this finding, it is considered that the pipe joints 4 and 4' portions froze first, the freezing pressure of the tube connecting portions 3 and 3' sections moved to the sections of the tube 1 that were enveloped by the corrugated tubes 9 and 9', the freezing pressure was absorbed by the tube 1 that was enveloped by the corrugated tubes 9 and 91, and therefore the pipe joints 4 and 4' were not damaged.

(Conclusion)

Damage of the pipe joints 4 and 4' due to freezing pressure could be prevented by fitting the corrugated tubes 9 and 9'. Further, by concentrating the freezing pressure in the tube 1 that is enveloped by the corrugated tubes 9 and 9', although a change occurred in the external diameter of the tube 1, since materials that return to their original state after thawing are used for the tube 1, the freezing did not affect the tube 1.

Other Embodiments

Although according to the above described Embodiment 1, corrugated tubes 9 and 9' are used to avoid damaging the pipe joints 4 and 4', this invention is not limited thereto, and any cover can be similarly used as long as the cover is a heat radiation preventing cover (a cover with a heat radiation prevention function).

Further, although according to the above described Embodiment 1 the cord heater 2 is passed through the inside of the tube 1, this invention is not limited thereto, and this invention can also be applied to a structure in which the cord heater 2 does not exist.

ADVANTAGES OF THE PRESENT INVENTION

The fluid transfer tube of this invention provides the following actions and advantages.

When an outside air temperature falls below freezing point, a fluid inside a tube and inside a pipe joint main body gradually freezes. In this case, according to the fluid transfer tube of this invention, the tube connecting portions of the pipe joints and the tube portions in the vicinity of the tube connecting portions are covered with heat radiation preventing covers so as to delay freezing of the tube portions covered by the heat radiation preventing covers. More specifically, according to this fluid transfer tube, a configuration is adopted such that a fluid inside the tube connecting portions of the pipe joints and inside the tube portions in the vicinity of the tube connecting portions freezes last.

Accordingly, even in a state in which a fluid inside a pipe joint has frozen and most of the tube has lost elastic force, there is a period in which tube connecting portions of pipe joints and tube portions in the vicinity the tube connecting portions that are covered with heat radiation preventing covers do not freeze. As a result, the amount of a volume increase caused by freezing of the fluid inside the pipe joint main body can be absorbed by the tube portions that have the elastic force.

In short, it can be understood that according to the fluid transfer tube of this invention which is made by mounting pipe joints to the ends of a tube, the pipe joints are not damaged even when an outside air temperature falls below freezing point.

What is claimed is:

1. A fluid transfer tube comprising a pipe joint mounted to an end of a tube having elasticity, wherein a tube connecting portion of the pipe joint and a tube part of the tube adjacent to the tube connecting portion are covered with a heat radiation preventing cover to shift a freezing pressure generated in the pipe joint to be absorbed by the part of the tube that is covered with the heat radiation preventing cover.

2. The fluid transfer tube according to claim 1, wherein a cord heater is passed through the inside of the tube.

3. The fluid transfer tube according to claim 1, wherein the heat radiation preventing cover comprises a corrugated tube.

4. The fluid transfer tube according to claim 1, wherein the tube connecting portion and the tube part of the tube adjacent to the tube connecting portion that are covered with the heat radiation preventing cover can absorb an amount of a volume increase that is caused by freezing of a fluid inside the pipe joint, by means of elasticity of a tube portion that is covered with the heat radiation preventing cover to shift freezing.

5. The fluid transfer tube according to claim 2, wherein the heat radiation preventing cover comprises a corrugated tube.

6. The fluid transfer tube according to claim 2, wherein the tube connecting portion and the tube part of the tube adjacent to the tube connecting portion that are covered with the heat radiation preventing cover can absorb an amount of a volume increase that is caused by freezing of a fluid inside the pipe joint, by means of elasticity of a tube portion that is covered with the heat radiation preventing cover to shift freezing.

7. The fluid transfer tube according to claim 3, wherein the tube connecting portion and the tube part of the tube adjacent to the tube connecting portion that are covered with the heat radiation preventing cover can absorb an amount of a volume increase that is caused by freezing of a fluid inside the pipe joint, by means of elasticity of a tube portion that is covered with the heat radiation preventing cover to shift freezing.

8. The fluid transfer tube according to claim 3, wherein the corrugated tube has a total length of 50 mm.

9. The fluid transfer tube according to claim 5, wherein the corrugated tube has a total length of 50 mm.

10. The fluid transfer tube according to claim 1, wherein the pipe joint is composed of an aromatic polyamide resin.

11. The fluid transfer tube according to claim 1, wherein the fluid transfer tube is a two-layer tube having a length of 1 m, an outer diameter of 8 mm, and an inner diameter of 6 mm.

12. The fluid transfer tube according to claim 11, wherein the heat radiation preventing cover has a total length of 50 mm.

* * * * *